United States Patent [19]

Könen

[11] Patent Number: 4,584,739
[45] Date of Patent: Apr. 29, 1986

[54] HINGE WITH LIFTING-OUT PROTECTION

[75] Inventor: Karl-Heinz Könen, Remscheid, Fed. Rep. of Germany

[73] Assignee: Carl Sülberg GmbH & Co., Remscheid, Fed. Rep. of Germany

[21] Appl. No.: 609,563

[22] Filed: May 11, 1984

[30] Foreign Application Priority Data

May 20, 1983 [DE] Fed. Rep. of Germany ....... 3318404

[51] Int. Cl.⁴ ............................................... E05D 7/10
[52] U.S. Cl. ......................................... 16/266; 16/380
[58] Field of Search ................. 16/262, 266, 267, 380, 16/386

[56] References Cited

U.S. PATENT DOCUMENTS

| 132,053 | 10/1872 | Child ..................................... 16/266 |
| 230,491 | 7/1880 | Peer ........................................ 16/266 |
| 2,052,465 | 8/1936 | Hardy, Jr. .............................. 16/266 |

FOREIGN PATENT DOCUMENTS

7501762 6/1975 Fed. Rep. of Germany .
2628951 6/1976 Fed. Rep. of Germany .
2748185 10/1977 Fed. Rep. of Germany .
8222340 8/1982 Fed. Rep. of Germany .
795881 6/1958 United Kingdom .

Primary Examiner—Fred Silverberg
Attorney, Agent, or Firm—Michael J. Striker

[57] ABSTRACT

For protection against an unauthorized lifting-out of a side wall of commercial vehicles from its chassis as well as for simple and secure handling of the side wall during turning as well as lifting-out or hanging-in, parts which form a hinge are formed so that a first hinge part has two aligning pivot pins, and in a turning angular region of the side wall a first pivot pin is held in an opening of the second hinge part, whereas a second pivot pin does not function in this turning angular region, the first hinge part is axially positively fixed relative to the second hinge part by a collar formed in the region of the pivot pins and extending over a part of the circumference of the pivot pins so as to engage in a recess of the second hinge part, and the side wall in its turned down position under the turning angular region can be displaced laterally axially so that the first pivot pin is completely withdrawn from the opening and the second pivot pin is inserted into a shell and held there, whereby then the side wall can be lifted upwardly from the shell.

5 Claims, 6 Drawing Figures

HINGE WITH LIFTING-OUT PROTECTION

BACKGROUND OF THE INVENTION

The present invention relates to a hinge with lifting-out protection, particularly for turnable and releasable connection of side walls of commercial vehicles with a chassis.

Hinges of the above-mentioned general type are known in the art and they must satisfy an important requirement that the respective side wall in raised condition must be secured against an unauthorized lifting-out. This is important especially when the respective commercial vehicle is used in a transit traffic with sealed storage space, wherein changes of the stored products must be prevented. Furthermore, such hinges must provide for a safe handling, particularly during hanging-in and lifting-out of the side walls.

A two-part hinge is disclosed, for example, in the DE-GM No. 8,222,340. In this hinge a lower hinge part mounted on the vehicle forms an upwardly open bearing shell which is open in two axial direction and receives a pivot axle which is held at both sides in side walls of an upper hinge part. The side walls of the upper part form therefore a protection against axial displacement of the upper part of the hinge. The bearing shell of the lower part has in its central region a vertical slot which extends from the front portion of the same with the same width over the lower and up to the rear portion. This slot serves in hung-in position of the side wall in cooperation with a disc mounted on the pivot axle, for protecting against an unauthorized lifting-out of the side wall. For lifting-out of the side wall, it must be turned downwardly by 180° and subsequently raised from the bearing shell. This raising is possible, since in this position of the side wall, the disc because of its one-sided hexagonal flattening, is disengaged from the slot. The lifting-out of a side wall is therefore characterized in the known hinge by two movements, namely the downward turning of the side wall and the subsequent raising-out from the bearing shell. This is disadvantageous since the downwardly turned side wall can be uncontrollably lifted from the bearing shell and dropped. This can take place, for example, during maneuvering of the vehicle when the downwardly turned side wall runs on a resistance.

Similar disadvantages are characteristic for the hinge disclosed in the DE-GM No. 7,501,762. In this hinge two bearing blocks formed of a sheet metal are mounted on a vehicle chassis with a lateral distance from one another and each form respectively an upwardly open bearing shell. A bearing pin welded on a bracket deformed from a sheet metal is inserted with projections extending beyond the bracket into these bearing shells. Each projection has at its one side a flattening which in cooperation with the contour of the bearing recess of the abovementioned bearing blocks prevents lifting-out of the respective side wall in raised condition. However, it allows an uncontrollable lifting-out in the turned-down condition.

The German Pat. No. 2,748,185 shows a two-part hinge whose lower part is mounted on a vehicle and whose upper part is mounted on the respective side wall. The lower part has an upwardly open bearing shell which is closed in an axial direction at its one end and receives a pivot pin mounted on the upper part and defining the pivot axle of the hinge. An axle is further provided in the lower part at the closed side of the bearing shell in alignment with the pivot axle. This further axle is engaged in the turned upwardly condition of the side wall with a hook mounted on the upper part. A block arranged on the upper part and carrying the pivot pin, and this hook, together prevent an axial displacement of the side wall, whereas lifting of the latter in the turned upwardly condition is prevented by the hook engaging the abovementioned further axle on the lower part. The disadvantage of this hinge is that during the downward turning of the side wall even over a relatively small turning angle, the hook no longer engages with the axle and from this position an inadvertent lifting-out of the side wall is possible.

A liftable-out door hinge is disclosed in the DE-OS No. 2,628,951, particularly for power vehicles, which has a vertical hinge axle. An upper branch part carries a spherical hinge pin which defines the hinge axle and engages in a cup-shaped recess in a lower branch part. A lifting-out protection is formed by a radially projecting safety blade provided in the upper branch part and engaging in a slot recess in the other hinge blade. The safety blade is concentric with the hinge pin but surrounds the latter only partially. This hinge possesses the disadvantage in that the door plate can be lifted-out in an outright manner, as soon as the safety blade leaves the slot recess.

SUMMARY OF THE INVENTION

Accordingly, it is an object of the present invention to provide a hinge for lifting-out protection which avoids the disadvantages of the prior art.

More particularly, it is an object of the present invention to provide a hinge with lifting-out protection which provides a sufficient protection from an unauthorized lifting-out of an upwardly turned side wall and at the same time guarantees a simple and safety handling.

In keeping with these objects and with others which will become apparent hereinafter, one feature of the present invention resides, briefly stated, in a hinge which additionally has a second pivot pin provided on a first hinge part and having a horizontal longitudinal axis, an opening and an upwardly open shell provided on a second hinge part and extending in an axial direction of both pivot pins, wherein in a first axial end position of the first part the first pivot pin is located in the opening and the first hinge part is fixed in an axially positive manner relative to the second hinge part in its turning angle secured from lifting out, and in a second axial end position of the first hinge part, the second pivot pin is located in the shell and the first pivot pin is located outside of the opening.

When the hinge is designed in accordance with the present invention, a reliable all-sided fixation of the side wall is obtained, and the arrangement of the first pivot pin in the opening particularly counteracts an unauthorized vertical lifting of the upwardly turned side wall. Non-allowable manipulations with the hinge are easily recognizable by the custom employees. An axial arresting of the side wall relative to the longitudinal axes of the pivot pins takes place in its upwardly turned position and in a selectable turning angular region downwardly of for example of 145°. Beyond this turning annular region downwardly the side wall can be axially displaced in a further angular region depending upon the respective vehicle type, until the first pivot pin leaves the opening and the second pivot pin is displaced into the shell. Only after this is it possible to lift the side wall from the shell upwardly. With the axial displacement in the movement sequence for lifting out of the side wall with two-stage rectangular change of the movement direction, a "baffle" is built which excludes the unintentional dangerous lifting-out of the side wall with a very high probability. The parts of the hinge can be forged or cast for high strength and robust construction, and connected with a side wall or a vehicle chassis by screwing, riveting or welding.

In accordance with another feature of the present invention, the longitudinal axes of the pivot pins are arranged in alignment with one another. With the aligned arrangement of the pivot pins the geometry of the first hinge part mounted on the side wall of the vehicle is simplified, and moreover, the advantage is provided in that during turning of the side wall and relieving its axial arresting, in each angular position the upwardly open shell of the second hinge part of the hinge stands opposite the second pivot pin, so that in all angular positions this shell can perform its holding function in a simple manner.

Still another feature of the present invention is that the axially positive fixing of the first hinge part relative to the second hinge part is performed by a collar inserted in a recess of the second hinge part. This provides for relative axial fixing of the part of the hinge in the selected turning angular region of the side wall in a simple manner. By varying the length of the circumference of the collar, the turning angular region can be fixed in any way, and after its exceeding an axial displacement possibility of the side wall is obtained.

A further feature of the present invention is that the collar is arranged in the connecting region of the pivot pins. This provides for an especially structurally favorable hinge.

Still a further feature of the present invention is that a web is formed onto the connecting region of the pivot pin and connects the pivot pins with a base plate of the first hinge part. In accordance with this feature a material-saving construction of the first hinge part with a high strength is provided.

An additional feature of the present invention is that the web has a limiting surface facing toward the second pivot pin, and the collar also has a limiting surface facing toward the second pivot pin, wherein these limiting surfaces lie in a common plane extending normal to the longitudinal axes of the pivot pins. This construction provides for the advantage in that the web, as considered in axial direction forms additionally to the collar, an abutting surface for the first part opposite to the upwardly open shell during axial displacement.

Yet an additional feature of the present invention is that the width of the web in direction of the longitudinal axes of the pivot pins substantially corresponds to the distance of a shell-facing limiting surface of the recess from the opening which receives the first pivot pin. In this case the web simultaneously forms an abutment surface for the first part of the hinge during its movement in direction to the opening which receives the first pivot pin. The first hinge part is here fixed axially at both sides, when the collar is located in the recess.

Finally, still another feature of the present invention is that the distance between limiting surfaces of the shell and a block which defines the opening, both extending normal to the longitudinal axes of the pivot pins and facing each other, is smaller than the distance between the free ends of the pivot pins and is greater than the distance between the shell-facing lateral limiting surface of the collar and the free end of the opening-faced first pivot pin. In this construction it is guaranteed that during axial displacement of the first hinge part and thereby the side wall relative to the second hinge part, a downward falling of the side wall is excluded. At the same time the first pivot pin cooperating with the opening can be completely withdrawn from the opening. After the predetermined turning angular region and the lateral displacement, the side wall is finally carried only by the shell so that a subsequent lifting of the side wall in an upward direction is possible.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

DESCRIPTION OF A PREFERRED EMBODIMENT

Figure 1:
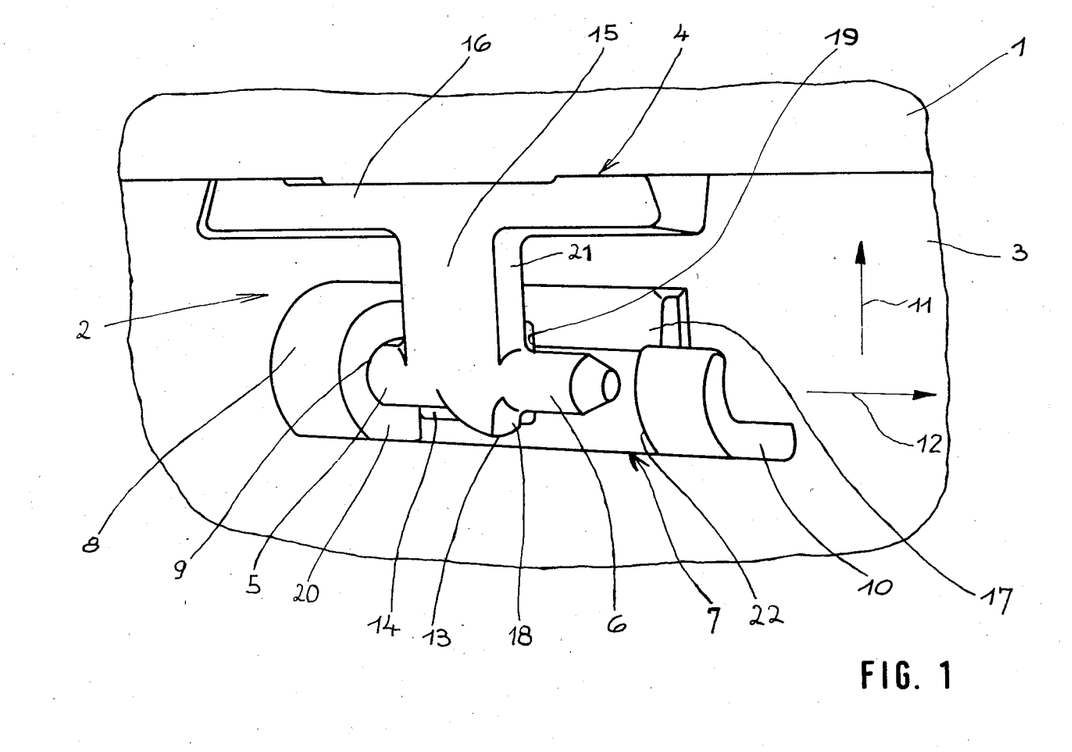
FIG. 1 is a view showing a hinge on a side wall turned upwardly on a vehicle chassis.
Figure 2:
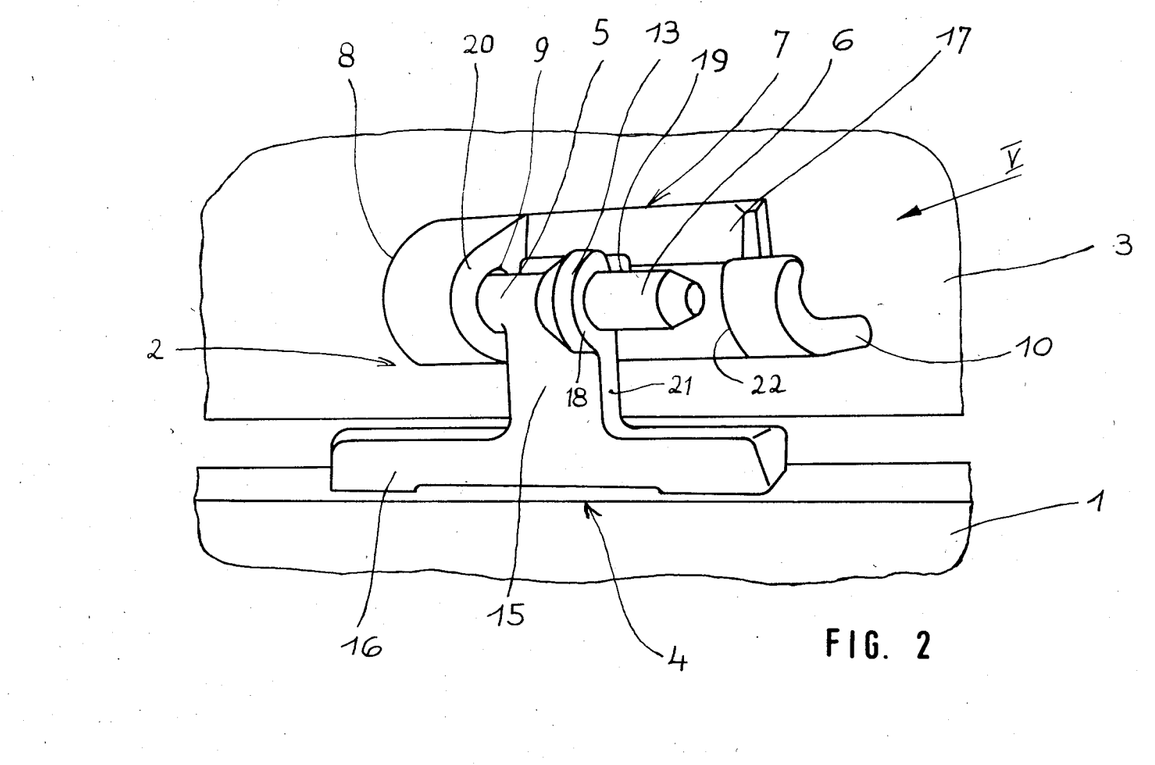
FIG. 2 is a view showing the hinge of FIG. 1, with the turned down side wall.
Figure 3:
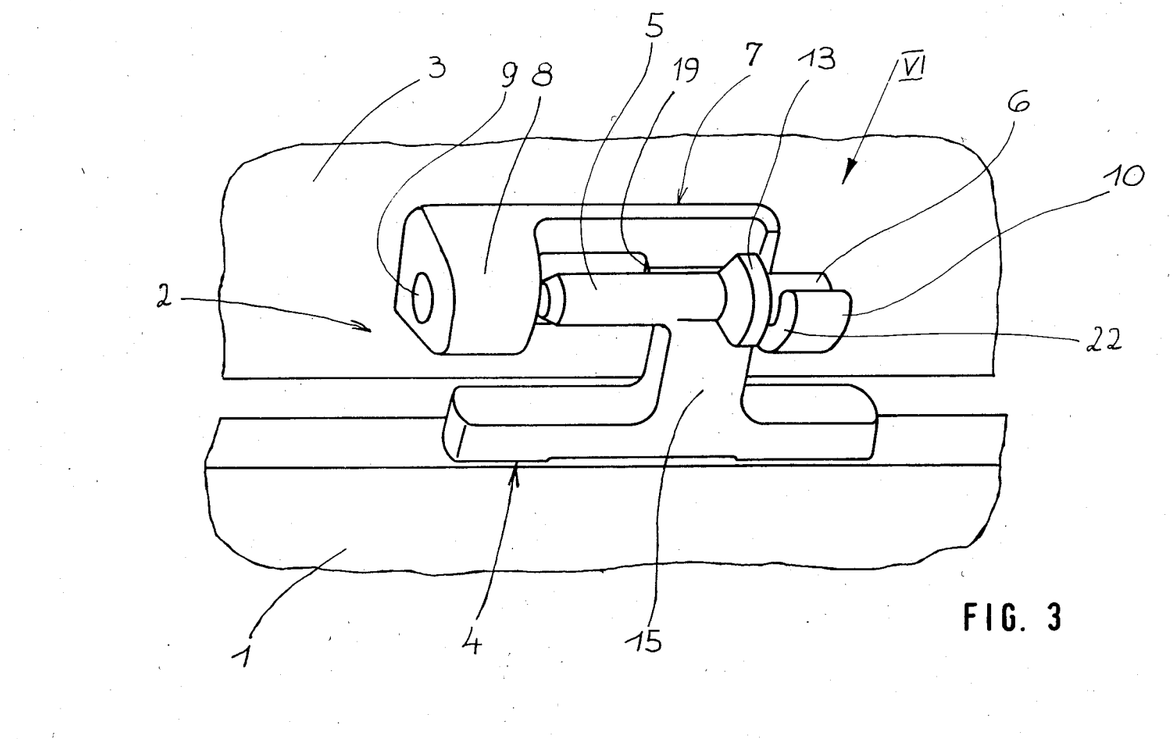
FIG. 3 is a view showing the hinge of FIG. 2 after a lateral displacement of the side wall.
Figure 4:
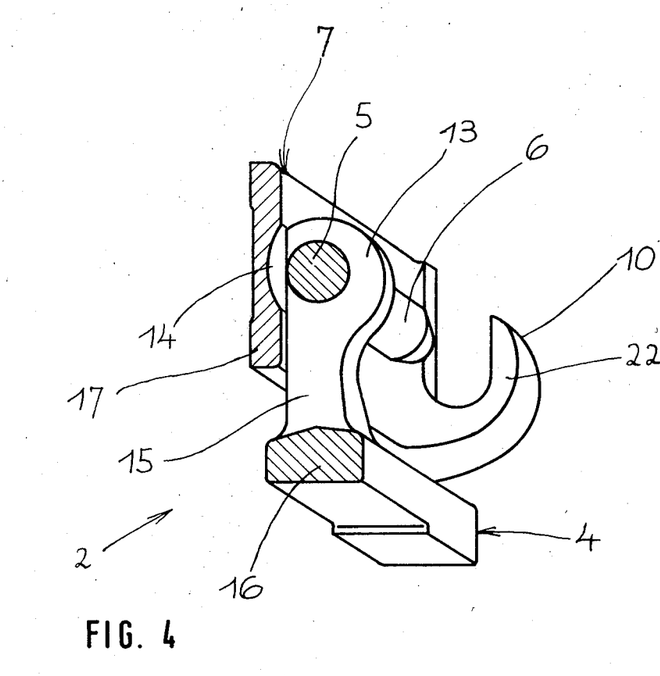
FIG. 4 is a view showing a section through the hinge of FIG. 2 wherein the section plane extends through a first pivot pin.
Figure 5:
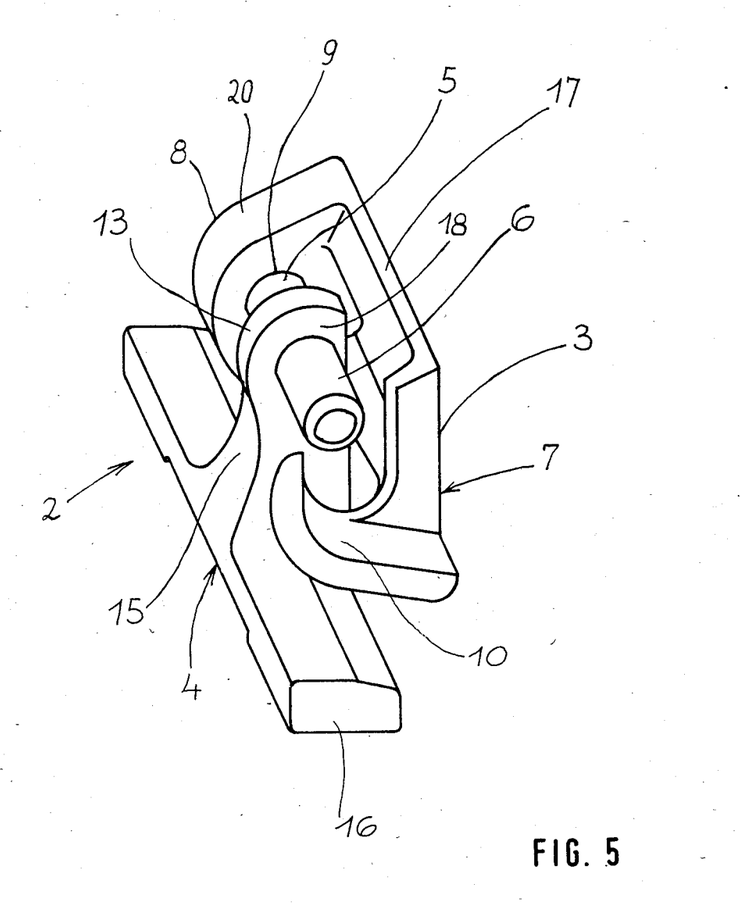
FIG. 5 is a view taken along the arrow V in FIG. 2.
Figure 6:
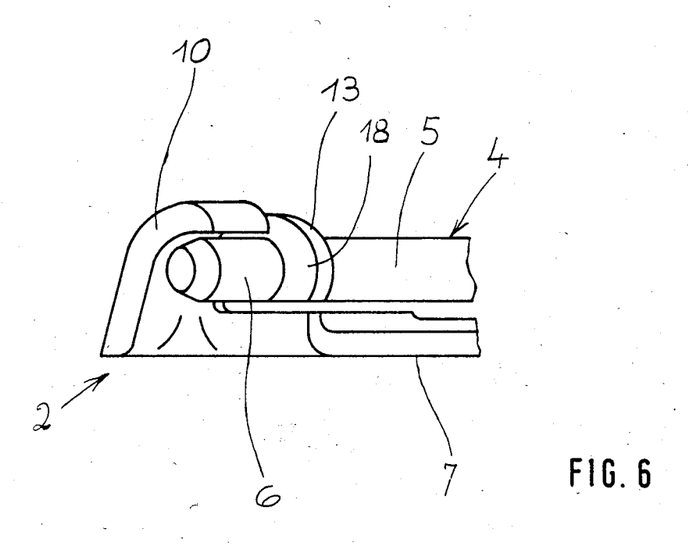
FIG. 6 is a partial view in direction of the arrow VI in FIG. 3.

FIG. 1 shows a side wall which is identified with reference numeral 1 and connected with a chassis 3 of a commercial vehicle, for example a truck by a hinge 2.

The hinge 2 has a first hinge part 4 mounted on the side wall 1 and having a first pivot pin 5 and a second pivot pin 6. It also has a second hinge part 7 mounted on the chassis 3 and having a block 8 with an opening 9, and a shell 10 spaced from the block 8 at a distance and open upwardly. The mounting of the hinge parts 4 and 7 of the hinge 2 on the side wall 1 and the chassis 3, respectively can be performed by welding, screwing or riveting, that is not shown in the drawing.

The pivot pins 5 and 6, as well as the opening 9 and the open shell 10 are in alignment with one another. Both hinge parts 4 and 7 of the hinge 2, are for example drop-forged pieces. The hinge part 7 can be particularly formed also as steel cast piece.

The hinge part 4 of the hinge 2, in the raised position of the side wall 1 of FIG. 1, is secured against lifting-out in direction of the arrow 11 by the pivot pin 5 located in the opening 9. Arresting of the hinge part 4 in an axial direction, or in other words in direction of the arrow 12 is performed by a collar 13 of the first hinge part 4.

The collar 13 is arranged coaxially to the pivot pins 5 and 6 along a part of the circumference. It can be brought in engagement with a recess 14 of the second hinge part 7 and provides then, with a lateral limiting surface 18 abutting against a lateral limiting surface 19 of the recess 14, for the abovementioned axial arresting.

A web 15 carries the pivot pins 5 and 6 and is connected with a base plate 16. The first hinge part 4 is mounted via the base plate 16 on the side wall 1.

The length of the pivot pins 5 and 6 is dimensioned so that in the raised condition of the side wall 1 it is held only by the first pivot pin 5 located in the opening 9, whereas in this axial position the second pivot pin 6 does not have any function.

FIGS. 2–6 show the hinge in positions in which the side wall 1 is turned downwardly. It can be seen that the collar 13 which in the raised position of the side wall 1 and in the turning angular region extening from it downwardly over for example 145° provides in cooperation with the recess 14 an axial arresting, allows under this turning region an axial displacement in direction of the arrow 12, shown in FIG. 1. For this purpose the collar 13 is shaped so that its outer limit extending along the circumference forms a circular line with a rectilinear limiting line which in the turned down condition of the first hinge part 4 extends parallel to a mounting plate 17 of the second hinge part 7. It can further be seen that the collar 13 which abuts with its limiting surface 18 against the limiting surface 19 located away from the opening 9, determines by its peripheral extension such a turning angular region of the hinge part 4 over which an axial displacement in direction of the arrow 12 is not possible.

The web 15 is dimensioned in its width extending in axial direction or in other words in direction of the arrow 12, so that this width substantially corresponds to the distance between the limiting surface 19 of the recess 14 and the opposite lateral limiting surface 20 of the block 8. Because of these features, the side wall 1 is axially arrested at both sides during the engagement of the collar 13 in the recess 14.

The collar 13 is shaped on the web 15 so that in the web its limiting surface 21 which faces toward the second pivot pin 6 and extends normally to the longitudinal axes of the pivot pins 5 and 6 lies in one plane with the lateral limiting surface 18 of the collar 13. Because of this an active abutment surface during axial displacement of the first hinge member 4 in direction of the arrow 12 relative to a lateral limiting surface 22 of the shell 10 is increased.

FIGS. 3–6 show the hinge 2 in a turned down position in which in addition, the side wall 1 is displaced laterally so that the first pivot pin 5 is completely withdrawn from the opening 9 and the second pivot pin 6 lies in the shell 10. Only in this position there is a possibility that the side wall 1 can be lifted upwardly out of the shell 10. It is clear that especially with a vehicle standing in an inclined position, a protection from an inadvertent lifting-out of the side wall 1 is provided, since the collar 13 and the web 15 in cooperation with the shell 10 limits a lateral axial displacing movement of the side wall 1 in any case.

It will be understood that each of the elements described above, or two or more together, may also find a useful application in other types of constructions differing from the type described above.

While the invention has been illustrated and described as embodied in a hinge with lifting-out protection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinge for lifting-out protection of a turnable and releasable side wall of a commerical vehicle on its chassis, comprising a first hinge part mountable on said side wall and provided with a first pivot pin having a substantially horizontal longitudinal axis and extending in a first axial direction, a second pivot pin having a substantially horizontal longitudinal axis and extending in a substantially opposite second axial direction, said pivot pins having free ends spaced from one another by a first distance, and a collar extending radially beyond and over a part of the periphery of said first pivot pin, said longitudinal axes of said pivot pins being arranged in alignment with one another, said pivot pins having a connecting region, a web being formed onto said connecting region, a base plate provided on said first hinge part and connected with said pivot pins via said web; and a second hinge part mountable on said chassis and having a recess, a substantially horizontal opening, and a substantially horizontally extending shell which is open upwardly and is spaced from said opening by a second distance, said second distance being smaller than said first distance, said hinge parts being formed so that in an upwardly turned position of the side wall and over a downward angular turning region of the side wall said first hinge part is located in a first axial end position in which said first pivot pin of said first hinge part extends into said opening of said second hinge part and said second pin free end is axially spaced from said shell so that said first hinge part and therefore the side wall cannot be lifted out, in said first axial end position said collar of said first hinge part is located in said recess of said second hinge part with a limiting surface on the collar in abutment with a limiting surface in the recess so that said first hinge part and therefore the side wall cannot move axially in said second axial direction, whereas, when the side wall is turned down beyond said angular turning region, said collar of said first hinge part disengages from said recess of said second hinge part and said first hinge part can be moved to a second axial end position in which said first pivot pin of said first hinge part is completely withdrawn from said opening of said second hinge part and said second pivot pin of said first hinge part is supported from below in said upwardly open shell of said second hinge part and an abutment surface on the web which faces toward said shell being in abutment with an abutment surface on the side of the shell so that the side wall is prevented from falling down and at the same time said first hinge part can be removed from said second hinge part upwardly thereby lifting the side wall out.

2. A hinge as defined in claim 1, wherein said collar is arranged in said connecting region of said pivot pins.

3. A hinge as defined in claim 1, wherein said abutment surface of said web and said limiting surface of said collar lie in a common plane which is normal to the longitudinal axes of said pivot pins.

4. A hinge as defined in claim 3, wherein said web has a width measured in direction of longitudinal axes of said pivot pins and substantially corresonding to a distance between the limiting surface of the recess and said opening which receives the first pivot pin.

5. A hinge as defined in claim 1, wherein said collar limiting surface is spaced from the free end of said first pivot pin facing said opening by a third distance, said shell abutment surface spaced by said second distance from a lateral limiting surface of a block of said second hinge part which defines said opening, said second distance being greater than said third distance.

* * * * *